Aug. 23, 1955   L. F. FENELL   2,716,036
PORTABLE KNOT TYING DEVICE
Filed Feb. 5, 1954   2 Sheets-Sheet 1
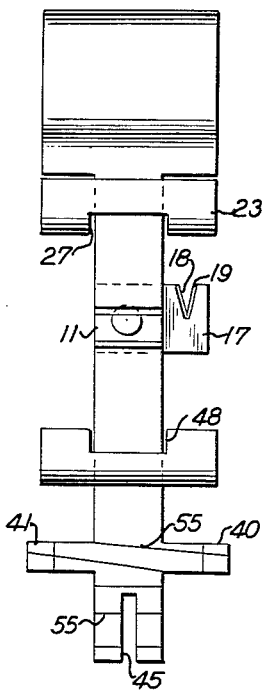
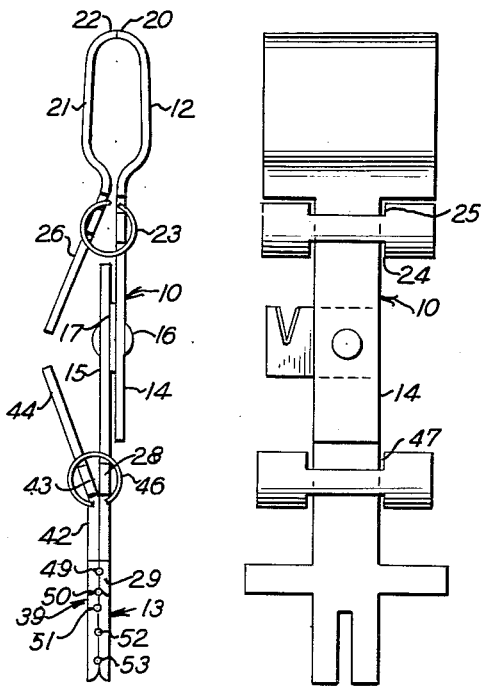
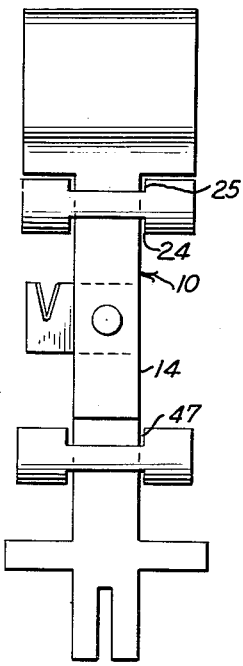
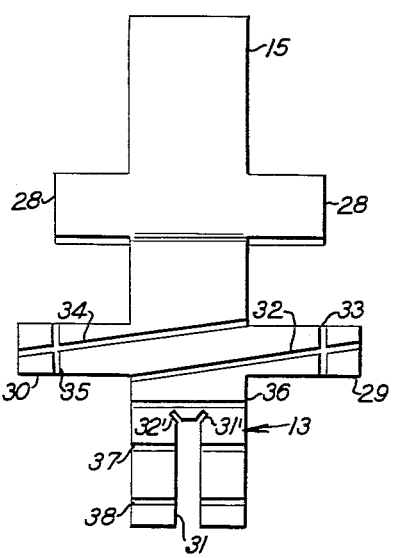
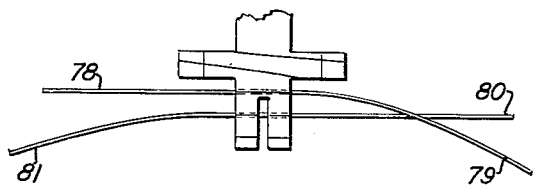
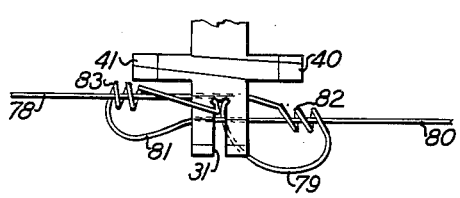
INVENTOR
Louis F. Fenell
BY Herbert J. Jacobi
ATTORNEY

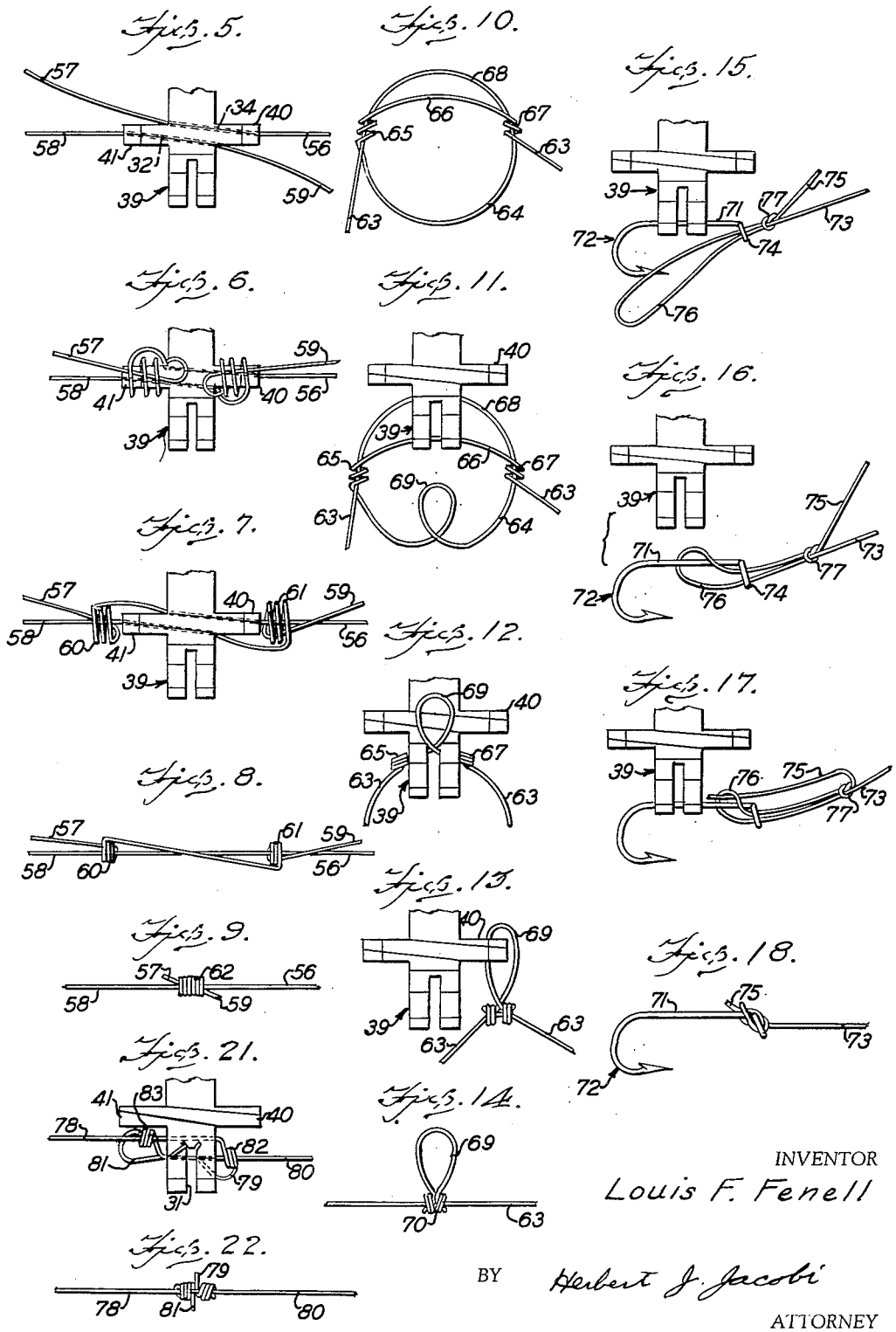

United States Patent Office 2,716,036
Patented Aug. 23, 1955

2,716,036

PORTABLE KNOT TYING DEVICE

Louis F. Ferrell, Altoona, Pa.

Application February 5, 1954, Serial No. 408,531

5 Claims. (Cl. 289—17)

This invention relates to the art of knot tying and more particularly to a device or implement to facilitate the tying of knots commonly employed by fishermen and other sportsmen.

Heretofore, numerous types of knit tying devices have been proposed and utilized but in the main, these have been somewhat unsatisfactory due to the fact that in many cases they were extremely cumbersome and not well suited to transportation in a tackle box or similar container and some of these required permanent attachment or mounting on a bench or other suitable supporting means. Furthermore, many of these prior art devices were only adapted for tying one or two knots and were not sufficiently versatile to permit typing of all of the knots commonly used by fishermen and all of which knots might well be employed in a single day of fishing. Furthermore, many of these prior art devices were only adapted for use in a workshop and were not adapted to be carried while on a fishing trip and utilized while fishing for tying the various types of knots necessary to join a line, attach hooks or leaders thereto, and also to attach wet or dry flies.

It is accordingly an object of this invention to provide a knot tying device or implement which may be conveniently mounted on any suitable support such as a tackle box or the like, and utilized to tie all of the common knots utilized by fishermen.

A further object of the invention is the provision of a relatively small, light knot tying vise which serves to securely hold the flexible elements being untied or tied to other objects and to prevent slippage of these elements while the various manipulations necessary to complete the knots, are being carried out.

A still fiurther object of the invention is the provision of a relatively light and small knot tying device which may be manually held or which may be conveniently supported on any suitable object.

Another object of the invention is the provision of a relatively small, light knot tying device which is provided with clamping jaws and grooves, the rein for securely holding the flexible elements to be united and also for positioning these elements in the most convenient location to facilitate the manipulations necessary for completing the knot.

A still further object of the invention is the provision of a relatively light, small knot tying device which may be utilized to facilitate the formation of a variety of knots commonly utilized by a fisherman, and also may be utilized to securely hold a hook while a line or leader is attached thereto.

Another object of the invention is the provision of a relatively light knot tying device which may be utilized to facilitate the formation of all knots commonly utilized by fishermen and which device may be conveniently constructed from readily available materials by relatively simple stamping and sheet metal operations which results in a low cost device readily saleable in a highly competitive market.

Further objects and advantages of the invention will be apparent from the following description taken in conjunction with the accompanying drawing wherein:

Fig. 1 is a front elevational view of a knot tying device constructed in accordance with this invention;

Fig. 2, a side elevational view of the knot tying device shown in Fig. 1;

Fig. 3, a rear elevational view of the knot tying device shown in Fig. 1;

Fig. 4, a front elevational view of one of the clamping jaws of the knot tying device shown in Fig. 1;

Figs. 5 to 7, fragmentary elevational views of the clamping jaws of the knot tying device of this invention and showing the same being utilized and the steps followed in tying a so-called leader knot, which may be utilized for uniting tapered leaders and mono-filament lines;

Figs. 8 and 9, elevational views showing the steps in completing the leader knot and the completed knot;

Fig. 10, an elevational view showing a preliminary operation in forming a dropper loop and the manner in which the strands are manipulated prior to use of the knot tying device of this invention;

Figs. 11 and 12 and 13, fragmentary elevational views of the clamping jaws of the knot tying device of this invention and showing the steps followed in forming the dropper loop;

Fig. 14, an elevational view of the completed dropper loop;

Figs. 15, 16 and 17, fragmentary elevational views of the clamping jaws of the knot tying device of this invention and showing the manner of utilization of these jaws to attach a line or leader to a hook;

Fig. 18, an elevational view of the completed knot for attaching a line or leader to a hook;

Figs. 19, 20 and 21, fragmentary elevational views showing the clamping jaws of the knot tying device of this invention and the procedure followed in forming a blood knot, which is utilized for joining two strands of leader or line together; and Fig. 22, an elevational view showing the completed blood knot.

With continued reference to the drawing there is shown a knot tying device constructed in accordance with this invention which may well comprise a frame 10 having a reduced intermediate portion 11 and at one end a relatively wide supporting jaw 12 and at the opposite end, a vise jaw 13, the structure and operation of which will be more fully described. The frame 10 may be constructed from lightweight sheet material, such as aluminum or plastic or the like, and may be formed as a single stamping or casting, or as shown in the drawing, may be formed of two parts in which one part 14 carries the supporting jaw 12 and another part 15 carries the vise jaw 13. These parts 14 and 15 may be united by a rivet 16 or any other suitable fastening means, as well as being welded together. The manner in which these individual parts are formed, or whether they are integral or formed as two separate parts united together, forms no part of the instant invention and consequently, the structure, as shown in the drawing, in which the frame 10 comprises two parts is for illustrative purposes only and should not be considered as in any way limiting the invention to the particular form shown.

In order to permit convenient severing of a line, leader or the like, a cutting device may be provided in conjunction with the tool of this invention, which device may well comprise a small strip 17 of relatively hard steel which may be secured to the frame 10 by means of the rivet 16 or any other suitable means and strip 17 may be provided with a V-shaped notch 18 the edges 19 of which are sharpened to provide cutting edges and it is only necessary to pull a line or leader downwardly in the notch 18 to conveniently sever the same.

As shown in Fig. 2, the supporting jaw 12 is of generally oval formation in cross section and terminates at its outer end in an inwardly extending jaw face 20. A movable supporting jaw 21 is provided with a jaw face 22 which serves to cooperate with the jaw face 20 on the stationary supporting jaw 12 and movable jaw 21 is pivotally mounted on the frame 10 by means of a curled spring 23 having an aperture 24 for receiving the frame 10 and the edge of the spring 23 is notched as at 25 to extend over and be retained on the frame 10. The movable jaw 21 is provided with a shank 26 which is reduced from the width of jaw 21 and shank 26 extends through an aperture 27 in the spring 23 and the spring 23 is provided on its opposite edge with a notch to be received over the shank 26 and thus retain the spring in position on such shank and retain the movable jaw 21 in position on the member 14 of the frame 10. Shank 26 also provides a finger engaging portion to permit convenient manipulation of the same to spread the jaw faces 20 and 22 and permit engagement of the same with a supporting object such as the edge of a tackle box, a convenient board or the edge of a box or any other object with which the clamping jaws 21 and 12 may be engaged. In this manner, a convenient supporting means is provided which may be manipulated to support the knot tying device of this invention in any desired position and which does not require the provision of a bench or other relatively large or heavy object, and further contributes to the utility of this device when actually engaged in fishing operation.

The member 15 of the frame 10 is provided with laterally extending ears 28, the purpose of which will be presently described and spaced longitudinally of the member 15 from the ears 28 are laterally extending ears 29 and 30 which are formed to facilitate the knot tying operations which will be presently described. The vise jaw 13 extends from the member 15 longitudinally thereof, and beyond the ears 29 and 30 the vise jaw 13 is provided with a longitudinally extending centrally disposed slot 31, the purpose of which will presently appear. Ear 29 may be provided with a diagonally disposed groove 32 in the inner face thereof, which groove extends from the outer end of the ear 29 to the opposite side of the jaw 13. The ear 20 may also be provided inwardly from its outer end with a groove 33 which intersects and crosses the groove 32. Similarly the ear 30 may be provided with a diagonally disposed groove 34 which is substantially parallel to the groove 32 and which groove 34 extends from the outer ear 30 to the opposite side of the member 15. The ear 30 may also be provided with a longitudinally extending groove 35 spaced inwardly from the outer end of the ear 30 and intersecting and crossing the diagonal groove 34. The vise jaw 13 may be provided with a series of spaced parallel grooves 36, 37 and 38, grooves 37 and 38 being interrupted by the slot 31.

Vise jaw 13 may also be provided with diverging recesses 31' and 32' opening into the slot 31 and the function of these recesses will be later described.

A cooperating vise jaw 39 may be formed similarly to jaw 13 and may be provided with laterally extending ears 40 and 41 which are co-extensive with the ears 29 and 30 on the jaw 13. The jaw 39 may also be provided with a reduced shank 42 from which extends laterally ears 43, there being an offset finger engaging portion 44 extending longitudinally of the shank 42 from the ears 43. Jaw 39 is adapted to be super-imposed on the jaw 13 with the ears 40 and 41 overlying the ears 29 and 30, and it is to be noted that jaw 39 is also provided with a slot 45 in the end thereof, which coincides with slot 31 in the jaw 13.

The jaw 30 may be pivotally mounted on the jaw 13 by means of a curled spring 46 provided with an aperture 47 for receiving the member 15 extending from jaw 13 and with an aperture 48 for receiving the finger engaging portion 44 of the jaw 39. Ears 28 on the member 15 and ears 43 on the finger engaging portion of the jaw 39 are received within the side curled spring 46 and since the edges of spring 46 engage the side surfaces of jaws 13 and 39, such jaws are urged into engagement with each other and the spring 46 also serves to pivotally mount the jaw 39 whereby upon depression of the finger engaging portion 44, the jaw 39 may be moved away from jaw 13 and upon release of the finger engaging portion 44, the jaw 39 will move into engagement or toward the jaw 13 to clamp workpieces therebetween.

If desired, the jaw 39 may be provided with diagonal grooves 49 and 40 corresponding to the diagonal grooves 34 and 32 respectively in the jaw 13 and also jaw 39 may be provided with spaced parallel grooves 51, 52 and 53 corresponding to the parallel grooves 36, 37 and 38 in the jaw 13. As in the jaw 13, grooves 52 and 53 are interrupted by the slot 45. The provision of the grooves in the inner face of jaw 39 is absolutely necessary and if desired, may be dispensed with. A plane inner face on the jaw 39 will operate to securely hold objects such as lines or leaders in the grooves in jaw 13. However, in some instances it may be desirable to have grooves provided in both jaws as shown in the drawing.

In order to facilitate insertion of leaders, lines and the like, within the grooves in the jaws 13 and 39 in a manner to be presently described the jaw 39 may, on its outer surface, be provided with lines or other markings 55 which are in alignment with the grooves provided in the jaws and which serve to indicate the location of such grooves and thus facilitate insertion of lines or leaders therein.

The knot tying device of this invention may be utilized to facilitate the tying of a wide variety of knots utilized by fishermen and others and for purposes of illustration, the operation of the device in tying four different kinds of knots will now be described. It is to be understood, however, that the device of this invention may be utilized for tying many other types of knots, but is not considered desirable or necessary to describe the exact operation thereof in connection with such knots, since it is believed that the description of the four knots to be described will be sufficient to indicate the versatility of the device and the manner in which the same is utilized to facilitate the tying of knots, and obviously, the ingenuity of the user in adapting the same to other types of knots, may be utilized as desired.

A leader knot is quite commonly utilized for joining tapered leaders or monofilament lines and the use of the device of this invention in forming such a knot is shown in Figs. 5 to 8 and the completed knot is shown in Fig. 9. The initial step is shown in Fig. 5 and in this case a line 56 may be positioned in the groove 34 in jaw 13 with an end 57 extending outwardly therefrom and a line 58 to be joined to the line 56 may be positioned in the groove 32 with an end 59 extending from the opposite side of the device. The spring 46 will operate to securely hold the lines 56 and 58 in position between the jaws 13 and 39.

As shown at Fig. 6, the end 57 of line 56 is wrapped around the laterally extending ears 30 and 41 from the outer ends of such ears inwardly for two or three turns and the end 57 passed through the turns as clearly shown in Fig. 6. Likewise, the end 59 of the line 58 is wrapped around ears 20 and 40 from the outer ends inwardly and for two or three turns, and the end 59 is passed through such turns as shown in Fig. 6. The turns 60 as shown in Fig. 7, are next removed from the ears 40 and 29. The jaws 13 and 39 of the knot tying device are next released by depressing the finger engaging portion 44 and the portions of the lines 56 and 58 held between the jaws are moved outwardly thereof to the position shown in Fig. 8. At this point, the lines 56 and 58 are pulled in opposite directions to move the turns 60 and 61 toward each other into tight engagement, leaving the ends 57 and 59 extending therefrom and as shown in Fig. 9, such ends may be cut off relatively close to the completed knot 62, thus firmly uniting the two lines 56 and 58 together with a non-slip knot.

Another type of knot quite frequently used by fishermen and others is the so-called dropper loop, the operations in the tying of which are shown in Figs. 10 to 13, the completed knot being shown in Fig. 14. As shown in Fig. 10, a line 63 is formed intermediate its length with a complete loop 64 and the line forming this loop is wrapped around the line 63 at one side of the loop to form two or three turns 65 and a portion 66 of the line is then passed across the loop and again around the opposite side thereof, for two or three turns as at 67, with the line 63 thus extending from each side of the loop 64. The upper portion 61 of the loop 64 is positioned between the jaws 13 and 39 with this portion 68 of the loop 64 disposed in the groove 36. Likewise, the connecting intermediate portion 66 is positioned in the groove 38 where these two portions 68 and 66 are firmly held in position by the jaws 13 and 39. At this point, the loop 64 is twisted to form a loop 69 of the desired size and such loop is inserted through the slots 31 and 45 in the jaws 13 and 39 between the portions 66 and 68. This part of the operation is clearly shown in Fig. 12. At this point all slack is taken up by pulling on the ends of the line 63 and on the loop 69 and the jaws 13 and 39 are separated to permit removal of the partially completed knot therefrom. The loop 69 is next positioned between the ears 40 and 29 of the jaws 39 and 13, and disposed in the groove 33 and at this time, the ends 63 of the line may be pulled in opposite directions to tighten and set the knot which is shown in its final form, as at 70 in Fig. 14. This knot serves to provide a loop intermediate of the length of a line 63, which may be utilized to attach hooks, sinkers or any other desired tackle thereto.

The knot tying device of this invention may also be utilized to facilitate attaching hooks or wet or dry flies to a line and the manner of making a knot of this nature is shown in Figs. 15 to 17 with the completed knot being shown in Fig. 18. In this operation, the shank 71 of a hook 72 may be disposed in the groove 38 of jaw 13 and firmly clamped therein by the jaw 39. At this time, a line or leader 73 is passed through the eye 74 of the hook and the end 75 of the line or leader 73 is passed through the eye 74 of the hook and the end 75 of the line or leader 73 is passed back through the eye 74 thus forming a loop 76 and the end 75 is tied to the line 73 outwardly of the eye 74 by an ordinary slip knot 77. At this point, the shank 71 of the hook 72 is removed from the jaws 13 and 39 and the loop 76 of the line or leader 73 is passed over the hook 72 and the shank 71 of the hook 72 is again clamped between the jaws 13 and 39 and the end 75 of the line or leader 73 is passed through the loop 76 and the slip knot 77 pulled tight against the eye 74 thus jamming the end 75 against the eye and shank of the hook 72. This serves to provide a completed knot as shown in Fig. 18.

Another form of knot which is frequently used to join strands of line or leader together is known as a blood knot, and the tying of such knot by utilizing the device of applicant's invention is best shown in Figs. 19 and 21 with the completed knot shown in Fig. 22. The initial operation in tying the blood knot comprises disposing the end of a line or leader 78 in the groove 36 of jaw 12, with the end 79 projecting from the opposite side thereof, and by positioning a line 80 in the groove 37 in the jaw 13 with the end 81 projecting from the opposite side thereof. The end 79 of line or leader 78 is wrapped around the line or leader 80 for two or three turns, as shown at 82 in Fig. 20 and the end 79 is passed through the slots 31 and 45 in the jaws 13 and 39 between the lines 78 and 80, and upwardly into the recess 31'. Likewise, the end 81 of line or leader 80 is wrapped around the line 78 for two or three turns as shown at 83, and the end 81 passed through the slots 31 and 35 in the jaws 13 and 39 and upwardly into the recess 32'. At this point, the knot will be in the condition shown in Fig. 20. The slack in the knot is then taken up by pulling on the lines 78 and 80, as shown in Fig. 21, and the entire knot is removed from between the jaws 13 and 39 and by pulling on the lines 78 and 80 and on the ends 81 and 79, the knot may be set to the form as shown in Fig. 22. This knot serves to provide a firm joint or connection between straight leaders or between the ends of a line.

It will thus be seen, that there has been provided by this invention a relatively simple and economically manufactured knot tying device which may be conveniently utilized to tie all of the knots commonly employed by fishermen and other sportsmen and likewise, a device which may be conveniently utilized in the field and mounted on the edge of a tackle box or other convenient object and which requires no special mounting means therefor and which is of such relatively small size that the same may be conveniently carried in a tackle box or other relatively small container. Furthermore, the device of this invention serves to hold the line or other flexible element being formed into a knot in various stages of the tying operation, thus preventing slippage of the line and also precluding the necessity for holding of many parts of the knot in the fingers while forming other parts thereof. Therefore, the device of this invention greatly facilitates and expedites the tying of such knots and insures that the resulting knot will perform the intended function without slipping, and without requiring undue time for tying the same.

It will be obvious to those skiled in the art that various changes may be made in the invention without departing from the spirit and scope thereof and therefore the invention is not limited by that which is shown in the drawing and described in the specification, but only as indicated in the appended claims.

What is claimed is:

1. In a knot tying device, a flat elongated member formed to provide a fixed vise jaw at one of its ends, said jaw having a centrally disposed longitudinally extending slot opening through the outer end thereof, spaced parallel transverse grooves formed in the upper surface of said fixed jaw to receive filaments therein, a second flat elongated member overlying the first member formed to provide a movable vise jaw at one of its ends and normally superimposed on said fixed jaw, a finger engaging portion extending angularly upward and rearward from the inner end of said movable jaw, means pivoting said second member to the first member adjacent the junction of said movable jaw with said finger engaging portion, and spring means urging said movable jaw toward said fixed jaw to clamp the said filaments in said grooves.

2. A knot tying device as defined in claim 1, in which said movable vise jaw is provided with grooves complimentary to the grooves in said fixed vise jaw.

3. A knot tying device as defined in claim 1 in which the outer surface of one of said vise jaws is provided with lines indicating the location of said grooves.

4. A knot tying device as defined in claim 1 in which one of said vise jaws is provided with recesses diverging from the longitudinal axis for receiving the ends of the filaments in said grooves being tied.

5. A knot tying device as defined in claim 1, with the said movable jaw also having a slot to register with the slot in said fixed jaw when the movable jaw is in filament clamping position, complemental pairs of ears extending laterally from the side edges of said jaws in spaced relation rearward from the inner ends of said slots, a groove in the upper surface of one of the ears of said fixed jaw extending diagonally from the outer end thereof to the opposite side of the fixed jaw, and another groove in the upper surface of the other ear of said fixed jaw extending diagonally from the outer end thereof to the opposite side of the fixed jaw and substantially parallel to the first diagonal groove.

References Cited in the file of this patent

UNITED STATES PATENTS

| | | |
|---|---|---|
| 2,488,414 | King | Nov. 15, 1949 |
| 2,502,751 | Roberts | Apr. 4, 1950 |